US011095809B2

(12) United States Patent
Ely et al.

(10) Patent No.: US 11,095,809 B2
(45) Date of Patent: Aug. 17, 2021

(54) METHOD AND SYSTEM FOR SCANNING OF A FOCAL PLANE ARRAY DURING EARTH OBSERVATION IMAGING

(71) Applicant: DRS Network & Imaging Systems, LLC, Melbourne, FL (US)

(72) Inventors: Philip Ely, Anaheim, CA (US); Mark Muzilla, Riverside, CA (US)

(73) Assignee: DRS Network & Imaging Systems, LLC, Melborne, FL (US)

( * ) Notice: Subject to any disclaimer, the term of this patent is extended or adjusted under 35 U.S.C. 154(b) by 55 days.

(21) Appl. No.: 16/369,415

(22) Filed: Mar. 29, 2019

(65) Prior Publication Data

US 2019/0306407 A1 Oct. 3, 2019

Related U.S. Application Data

(60) Provisional application No. 62/650,978, filed on Mar. 30, 2018.

(51) Int. Cl.
*H04N 5/232* (2006.01)
*H04N 5/225* (2006.01)

(52) U.S. Cl.
CPC ....... *H04N 5/23216* (2013.01); *H04N 5/2254* (2013.01)

(58) Field of Classification Search
CPC ............. H04N 5/23216; H04N 5/2254; H04N 5/23277; H04N 5/2253; H04N 5/23287; G01S 3/7865; G02B 26/101; G01C 21/10
See application file for complete search history.

(56) References Cited

U.S. PATENT DOCUMENTS 5,672,866 A * 9/1997 Messina ................. G01C 11/02
250/236
8,218,016 B2 7/2012 Park et al.
(Continued)

FOREIGN PATENT DOCUMENTS

WO 2008/075335 6/2008

OTHER PUBLICATIONS

NASA, "17 Projects Awarded Funding Under the Instrument Incubator Program (IIP)", 2016 Roses A.42 Solicitation NNH16ZDA001N-IIP Research Opportunities in Space and Earth Sciences, Oct. 31, 2016, located at https://esto.nasa.gov/files/solicitations/IIP_16/ROSES2016_IIP_A42_awards.html, 11 pages.
(Continued)

*Primary Examiner* — Nhan T Tran
(74) *Attorney, Agent, or Firm* — Kilpatrick Townsend & Stockton LLP

(57) ABSTRACT

An imaging system includes a body, a stage coupled to the body, and an actuator coupled to the body and the stage. The actuator is configured to move the stage in one or more directions relative to the body. The imaging system also includes a focal plane array including one or more detectors and coupled to the stage and a controller coupled to the actuator. The controller is configured to determine a velocity of the body and to cause the actuator to backscan the stage in the one or more directions at a drive velocity corresponding to the velocity of the body. Moreover, the controller is communicatively coupled to the one or more detectors and causes the one or more detectors to capture image data during the backscan.

18 Claims, 9 Drawing Sheets

(56) References Cited

U.S. PATENT DOCUMENTS

| | | | |
|---|---|---|---|
| 2005/0177307 A1* | 8/2005 | Greenfeld | G01C 21/165 |
| | | | 701/409 |
| 2012/0098982 A1* | 4/2012 | Watanabe | H04N 5/23258 |
| | | | 348/208.4 |
| 2014/0362177 A1* | 12/2014 | Dunn | G03B 37/02 |
| | | | 348/37 |
| 2018/0252936 A1* | 9/2018 | Owens | G02B 26/101 |
| 2019/0084698 A1 | 3/2019 | Leatham et al. | |
| 2019/0161212 A1* | 5/2019 | Solanyk | G01S 3/7865 |
| 2020/0145568 A1* | 5/2020 | Vollmerhausen | H04N 5/23258 |

OTHER PUBLICATIONS

PCT/US2019/024844, "International Search Report and Written Opinion", dated Jun. 18, 2019, 8 pages.

\* cited by examiner

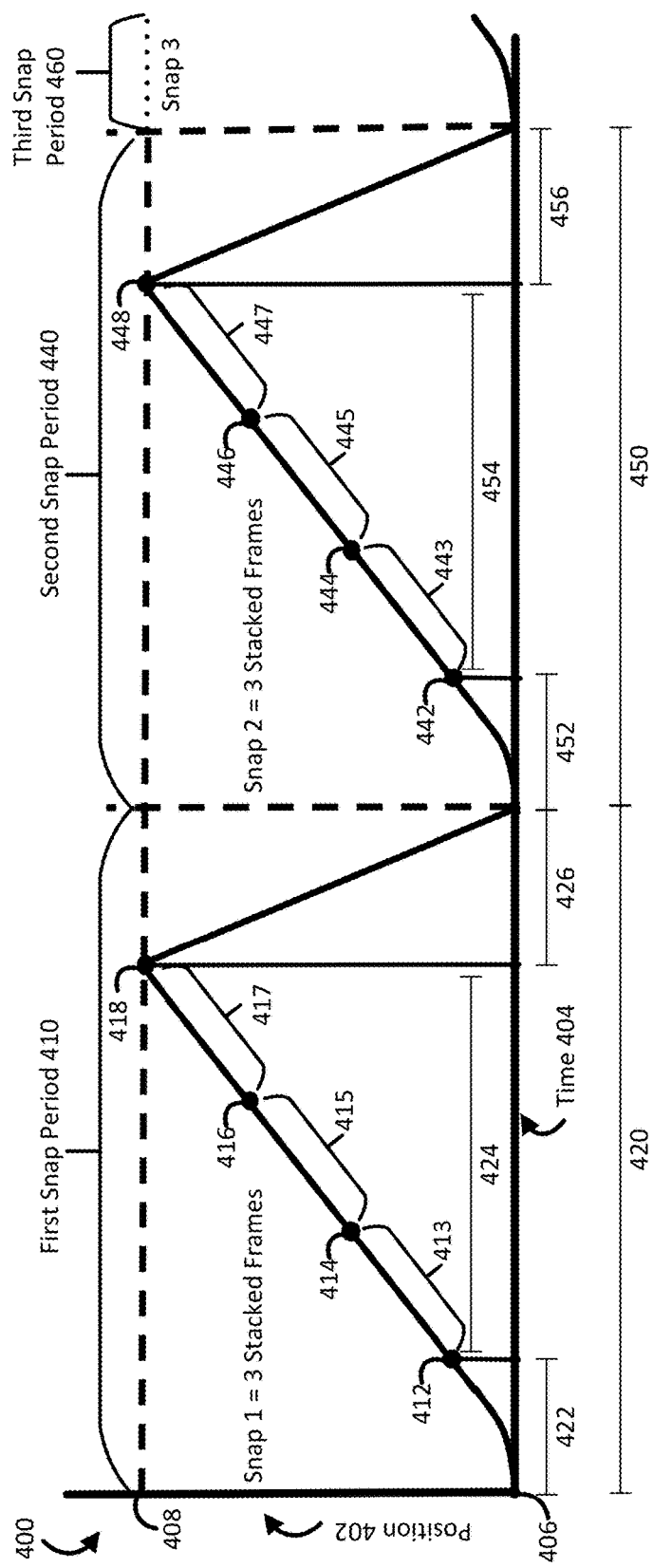
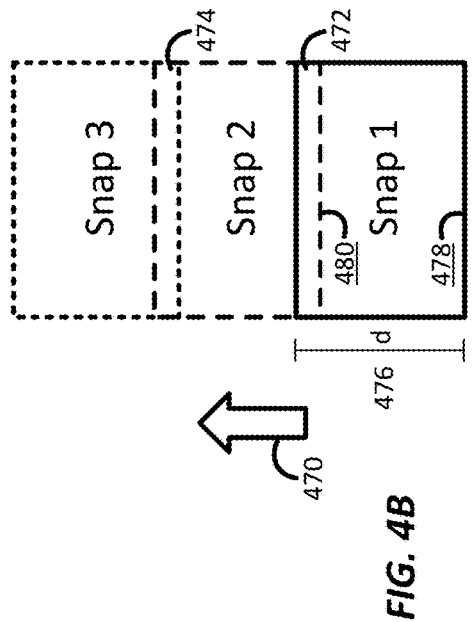
FIG. 4A
FIG. 4B

METHOD AND SYSTEM FOR SCANNING OF A FOCAL PLANE ARRAY DURING EARTH OBSERVATION IMAGING

CROSS-REFERENCES TO RELATED APPLICATIONS

This application claims priority to U.S. Provisional Patent Application No. 62/650,978, filed on Mar. 30, 2018, entitled "Method and System for Scanning of a Focal plane array During Earth Observation Imaging," the disclosure of which is hereby incorporated by reference in its entirety for all purposes.

BACKGROUND OF THE INVENTION

Satellite imaging has been developed. Low earth orbit imaging applications using staring sensors experience image smearing due to the satellite ground velocity. Thus, there is a need in the art for improved methods and systems related to satellite imaging.

SUMMARY OF THE INVENTION

Embodiments of the present invention relate generally to systems and methods for image stabilization and, in particular, to reduction of image blur or smear using a focal plane array positioning system. The focal plane array positioning system can backscan a focal plane array to reduce or remove image smear, improve relative edge response, and allow an increased integration time associated with an image. Increasing the integration time can improve the signal to noise ratio of the sensor and improve the ability to detect features in the observed scene. Backscanning the focal plane array reduces or eliminates the need to incorporate additional scan mirrors and complex mechanical systems to move a lens or steer the field of view in front of the lens to stabilize the image.

According to an embodiment of the invention, an imaging system includes a body, a stage, and an actuator. In some embodiments, an actuator can be coupled to the body and the stage and be configured to move the stage in one or more directions relative to the body. An image sensor can be coupled to the stage. A focal plane array including one or more detectors can be coupled to the stage. A controller can be coupled to the actuator and configured to determine a velocity of the body and cause the actuator to move the stage in one or more directions to backscan the stage in the one or more directions at a drive velocity corresponding the velocity of the body. The controller can be communicatively coupled to the one or more detectors and cause the one or more detectors to capture image data during the backscan.

In some embodiments, the actuator can be a piezoelectric actuator. In some embodiments, the imaging system includes a lens coupled to the body. In some embodiments, the drive velocity can be characterized by a sawtooth profile. In other embodiments, the velocity of the body can correspond to a forward velocity of at least one of an aircraft or a satellite. In some embodiments, the one or more detectors comprises one or more focal plane arrays. The one or more focal plane arrays can include one or more spectral filters. In some embodiments, the imaging system can include an I/O module configured to transmit and receive at least one or more of the velocity of the body, the drive velocity, or the image data.

According to an embodiment of the invention, a method is provided. The method provides a body. The method provides an actuator coupled to the body. The method further provides a stage coupled to the actuator. The method provides an image plane coupled to the stage. The method determines a body velocity corresponding to motion of the body. In some cases, determining the body velocity includes reading body velocity from a memory. In some cases, determining the body velocity includes receiving the body velocity from an I/O subsystem. The method determines a drive velocity associated with the body velocity. The method backscans the stage at the drive velocity relative to the body velocity using the actuator. In some cases, the backscanning includes sending a control signal to the actuator. In some cases, the backscanning includes determining one or more gain coefficients and updating the drive velocity in response to the one or more gain coefficients. The method captures one or more frames during backscanning of the stage by the image sensor.

In some embodiments, the method further includes determining a position of the stage using the drive velocity and a timer. In some embodiments, the method provides one or more stage position sensors, receives position sensor data from the one or more stage position sensors, and determines stage position using the position sensor data. In some embodiments, determining the body velocity further comprises receiving the body velocity from an I/O subsystem.

According to another embodiment of the invention, a method is provided. The method includes sending a control signal to an actuator to start a backscan of a stage at a drive velocity. The method further includes determining a body velocity. The method further includes determining a position of the stage. The method further includes updating the drive velocity in response to the body velocity and the position of the stage. Additionally, the method includes determining that the stage reaches a cutoff amplitude. The method further includes sending a second control signal to reset the stage to an initial position.

In some embodiments, the method includes sending the control signal and resetting a timer. The method can determine the position of the stage using the body velocity and the timer. In some embodiments, determining the body velocity includes at least one of reading body velocity from a memory, receiving the body velocity from an I/O subsystem, and receiving the body velocity from a sensor. In some embodiments, the method can update the drive velocity by determining one or more gain coefficients and updating the drive velocity in response to the one or more gain coefficients. In some embodiments, determining the stage reaches the cutoff amplitude includes receiving position sensor data and determining the position sensor data exceeds a value associated with the cutoff amplitude. Numerous benefits are achieved by way of the present invention over conventional techniques.

BRIEF DESCRIPTION OF THE DRAWINGS

Illustrative embodiments of the present disclosure are described in detail below with reference to the following drawing figures.

FIG. 4A illustrates two full cycles of capturing consecutive image frames with a focal plane array moving at a velocity equal to the velocity of the image on the focal plane array according to an embodiment of the present invention.

FIG. 4B illustrates the overlap between snaps according to an embodiment of the present invention.

DETAILED DESCRIPTION OF SPECIFIC EMBODIMENTS

Figure 1:
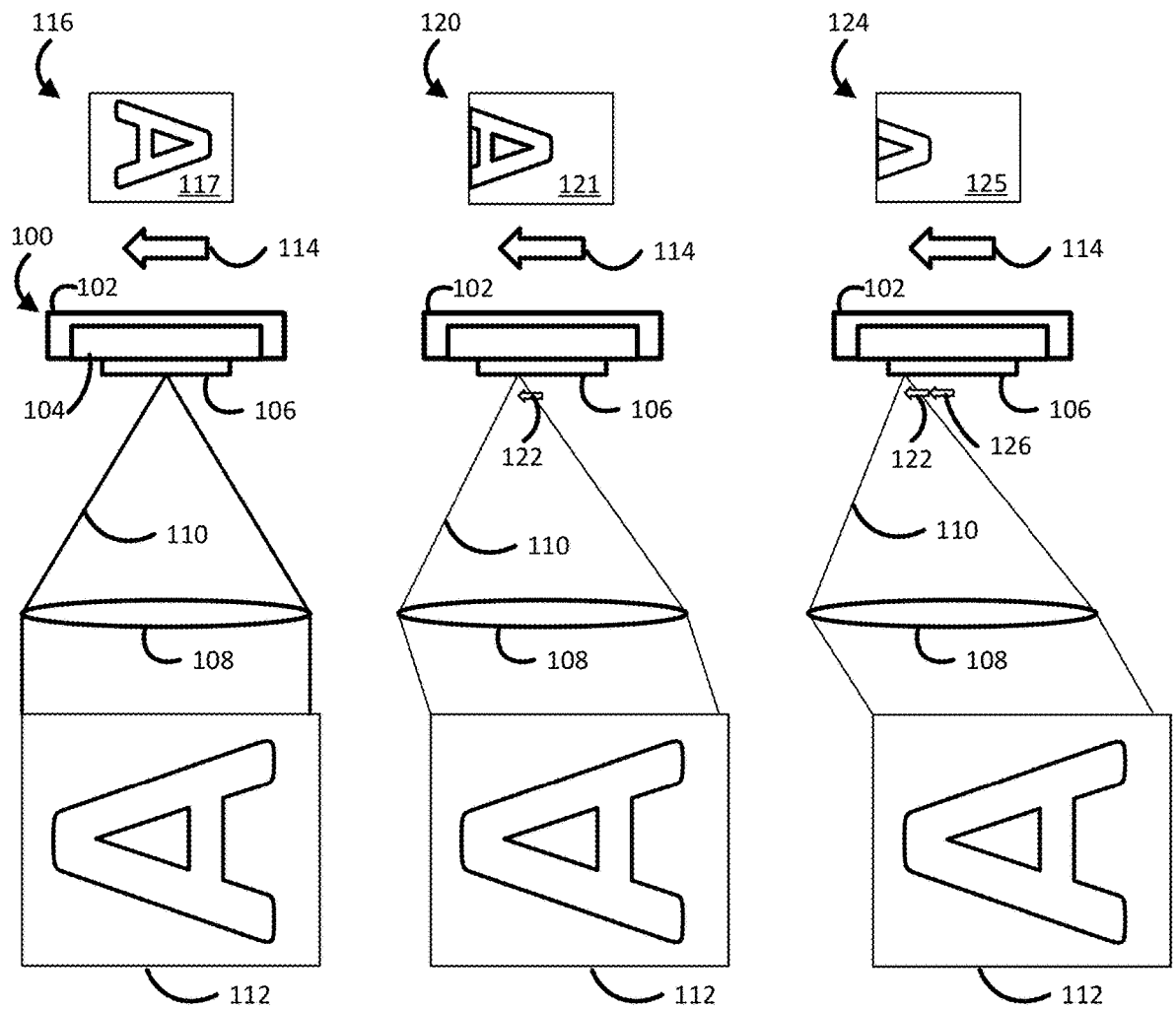
FIG. 1 illustrates three successive frames captured using an imaging system with a focal plane array that is not adjusted for the motion of the camera body according to an embodiment of the present invention.

Numerous sources of interference exist in satellite imaging technologies. Conventional techniques to stabilize an image during a Focal Plane Array integration time use a fast steering mirror in the optical chain or physically steer the optical system to control the pointing of the image on the focal plane array. Fast steering mirrors are large and can take up a significant amount of space, especially when located at the entrance aperture of the optical system. Because of their size, large moving mirrors require more time to move and time to settle before the integration time can commence, leaving less time for integration of signal and/or frame stacking. The present invention can backscan a focal plane array by moving the focal plane array to match the image motion instead of steering the image. Embodiments described herein are more compact and improve reliability over conventional techniques used for spaceborne and airborne applications.

To improve the signal to noise ratio of an image of a scene on the ground, individual frames of the scene on the ground captured by an image sensor can be co-added. Co-adding is simplified if the image has not moved relative to the sensor and no image registration is required. Large staring focal plane arrays used in modern satellites and aerial cameras are subject to image blur or smear due to the motion of the stage during the exposure time. The image blur or smear reduces the useful integration time for a large staring focal plane array and as a result, image quality. Existing technologies to address image blur caused by the motion of a focal plane array in a moving platform, such as a satellite, include complex mechanical systems to move the lens barrel or incorporate additional scan mirrors. Accordingly, there is a need in the art for improved methods and systems related to reducing image blur in cameras positioned in a moving platform.

Embodiments of the present invention provide a method for reducing image blur or smear present in scans taken using high altitude imaging systems, for example, satellite-based imaging systems. More specifically, embodiments of the present invention utilize a piezo driven stage to translate the focal plane array of a sensor. In some embodiments, the focal plane array of the sensor is a staring focal plane array. In some embodiments, the sensor can be part of a satellite space platform that is moving relative to the earth. The focal plane array of the sensor can be translated in the same axis as the sensor's motion relative to the earth. The piezo driven stage velocity can be matched to the velocity of the satellite resulting in a backscan of the focal plane array so that the image appears static during a focal plane array integration period. In some embodiments, the integration period can be continuous during the duration of the backscan of the focal plane array. In other embodiments, multiple consecutive frames can be stacked together to form a single snap. The backscan of the focal plane array results in the target image not moving relative to the focal plane array during the backscan. The piezo driven stage can return to a starting position while the trailing edge of the field of view moves across a scene on the ground that has already been captured. In some embodiments, the focal plane array can include a focal plane array that captures images from multiple spectral bands. Embodiments of the present invention provide a stabilized staring imager. Each individual two-dimensional staring image can be stitched together to create a larger two dimensional image. The use of this technology enables the use of staring focal plane arrays in applications that have a scan motion that historically used linear scan sensors.

FIG. 1 illustrates three successive frames captured using an imaging system with a focal plane array that is not adjusted for the motion of the camera body according to an embodiment of the present invention. The imaging system 100 includes one or more of a detector module 102, a stationary stage 104, a focal plane array 106, and a lens 108. In some embodiments, the imaging system 100 can be mounted in a moving vehicle such as a satellite, an aircraft, an automobile, and the like. FIG. 1 also illustrates the rays 110 associated with an object on the ground 112.

In FIG. 1, the imaging system 100 is moving at a velocity 114 over the object on the ground 112. In a first frame 116, the rays 110 associated with the object on the ground 112 are centered on the focal plane array 106 and a first image 117 on the focal plane array 106 shows the object on the ground 112. The motion of the system causes the image plane formed by the lens 108 to move. For a second frame 120, imaging system 100 has moved relative to the object on the ground 112 due to the velocity 114 of the imaging system 100. In the second frame 120, the rays 110 associated with the object on the ground 112 are no longer centered on the focal plane array 106 but have moved a first distance 122. Accordingly, a second image 121 on the focal plane array 106 is different from the first image 117.

For a third frame 124, the imaging system 100 has moved further relative to the object on the ground 112 due to the velocity 114 of the imaging system 100. In the third frame 124, the rays 110 associated with the object on the ground 112 have now moved the first distance 122 and a second distance 126. Accordingly, a third image 125 on the focal plane array 106 is different from the first image 117 and the second image 121. If an image of the object on the ground 112 was produced without image registration from the integration of the first image 117, the second image 121, and the third image 125, the integrated image of the object on the ground 112 would include significant blur. To prevent image blur from within the first image 117, the second image 121 or the third image 125, the integration time of the sensor must be significantly less than the time it takes for a single pixel on the sensor to move one pixel length. Otherwise, significant image blur occurs within each of the first image 117, the second image 121 or the third image 125.

Figure 2:
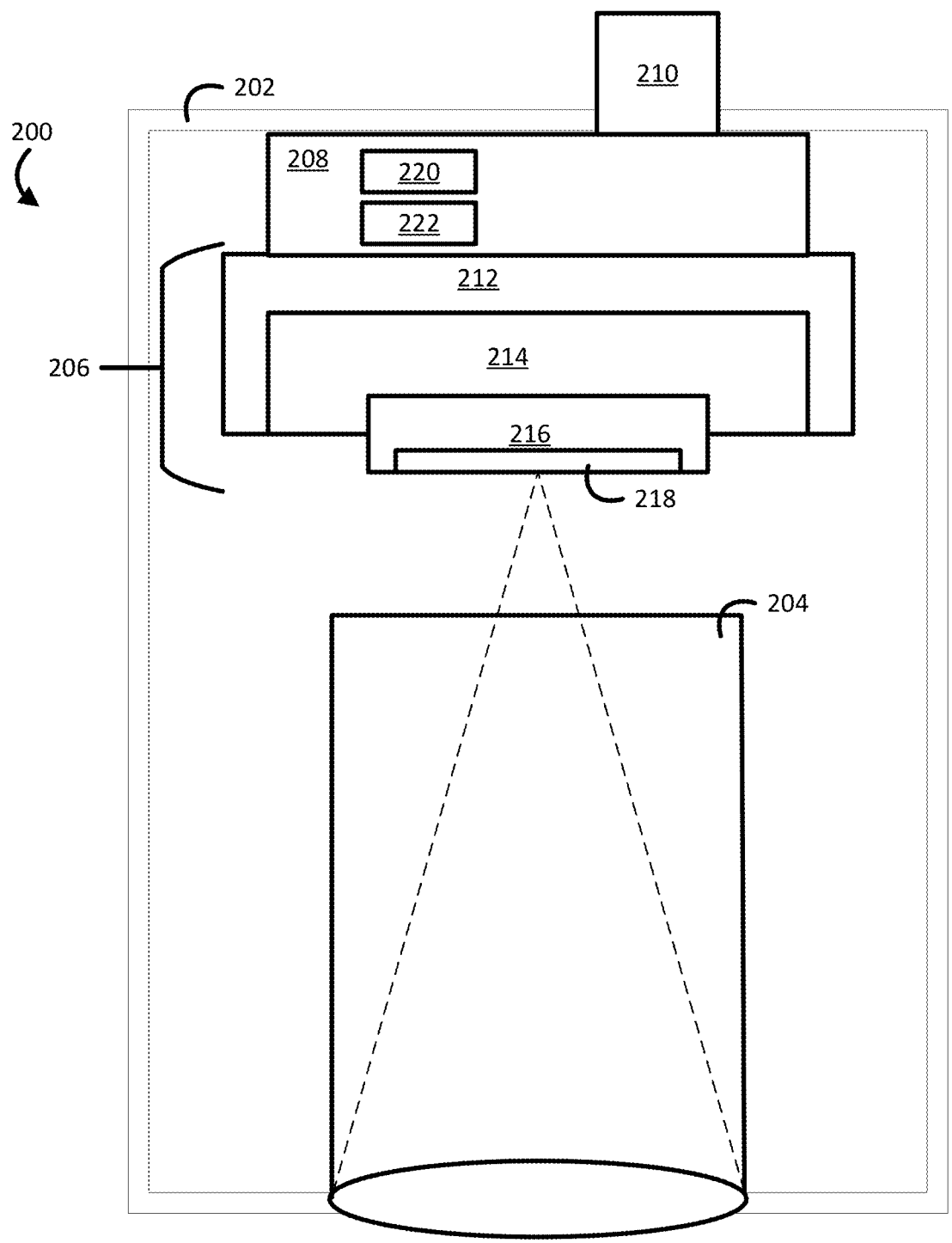
FIG. 2 illustrates an imaging system configured to backscan a focal plane array during motion of the imaging system according to an embodiment of the present invention. according to an embodiment of the present invention.

FIG. 2 illustrates an imaging system configured to backscan a focal plane array during motion of the imaging system according to an embodiment of the present invention. Backscanning the focal plane array makes it possible to dwell long enough during a capture of an image to obtain a reasonable Signal to Noise Ratio (SNR). Backscanning also allows fame stacking of successively captured frames, reducing blurring the image. If the noise is "white" in nature, frame stacking benefits the SNR by the square root of the number of frames stacked. An image made up of 4 frames stacked has two-times higher SNR than an image taken with one frame. The imaging system 200 can include a camera body 202, a lens 204, a detector module 206, a controller 208, and an I/O module 210. In some embodiments, the camera body 202 of the imaging system 200 is positioned in a vehicle such as satellite or an aircraft. In some embodiments, the camera body 202 can be configured to provide structural support and alignment for the detector module 206 and lens 204. In some embodiments, the camera body can include anchor points for the controller 208 and the I/O module 210 and can be configured to manage heat transfer and isothermal performance. In other embodiments, the camera body 202 can be replaced by two separate bulkheads. The lens 204 can be mounted on a first bulkhead and the detector module 206, controller 208, and I/O module 210 can be mounted on a second bulkhead.

In some embodiments, the lens 204 can be optimized for the transmission of a specific wavelength such as visible, near-infrared, short-wavelength infrared, mid-wavelength infrared, long-wavelength infrared, and far infrared. In some embodiments, lens 204 can be an optical system with one or more optical elements such as a lens, a filter, a beam splitter, a collimator, a diffraction grating, and the like.

The detector module 206 can include a body 212, an actuator 214, a stage 216, and a focal plane array 218. The body 212 of the detector module 206 can be coupled to the camera body 202 and/or the controller 208. In some embodiments, the detector module 206 is communicatively coupled to the controller 208 and/or the I/O module 210. In some embodiments, the controller 208 may be positioned outside the camera body 202.

The actuator 214 can be coupled to the body 212 and the stage 216 and be configured to move the stage 216 in one or more directions relative to the body 212. In some embodiments, the actuator 214 can include a piezoelectric actuator configured to move the stage 216 with a focal plane array 218, such as a focal plane array, to counter the motion of a satellite platform or aircraft. The piezoelectric actuator can be configured to move along a single axis or multiple axes. In some embodiments, the amplitude of the piezoelectric actuator along a single axis can be 1200 The amplitude of the movement of the actuator can range from 50 μm to 1800 μm. In some embodiments, the actuator 214 can provide a backscan resolution on the order of 0.1 nm. In other embodiments, the actuator can provide a backscan resolution on the order of 2 nm. In some embodiments, the piezoelectric actuator can control the motion of the stage 216 using flexure guides. The flexure guides can provide frictionless motion with no rolling or sliding parts.

Although some embodiments have been discussed in terms of a piezoelectric actuator, it should be understood that the actuator can be implemented using mechanical actuators, electro-mechanical actuators, hydraulic actuators, pneumatic actuators, and the like. Thus, the actuator 214 is not intended to denote a piezoelectric actuator, but to encompass machines that move or control a stage 216 to backscan a focal plane array 218. One of ordinary skill in the art would recognize many variations, modifications, and alternatives.

In some embodiments, the actuator 214 can include one or more sensors to monitor the motion and position of the stage 216. The one or more sensors can measure in-plane performance such as position, velocity, acceleration, and the like which affect image smearing. The one or more sensors can also measure out of plane performance such as motion along the z-axis which affects image focus. In some embodiments the one or more sensors are capacitive sensors. In other embodiments, the one or more sensors can include a laser displacement sensor. The position of the stage can be transmitted to the controller 208 and/or the I/O module 210 for use in image processing and control loop calculations.

The stage 216 coupled to the actuator can include the focal plane array 218. The focal plane array 218 can be configured with one or more focal plane arrays operable to collect image data. In some embodiments, the focal plane array 218 can include a microbolometer. The microbolometer can consist of an array of pixels, each pixel being made up of several layers. In some embodiments, the focal plane array 218 can be a passive Infrared (IR) detector that does not require supplemental illumination or light. In some embodiments, the focal plane array 218 can operate without cooling of a detector material. In other embodiments, the detector module 206 can include thermal strapping between the focal plane array 218 and the body 212. An uncooled microbolometer array can enable reductions in size, weight, and power requirements relative to cooled thermal cameras. In some embodiments, the focal plane array 218 can include one or more spectral filters. In some embodiments, the focal plane array 218 can be a multi-spectral band imager. In other embodiments, the focal plane array can include a Complementary Metal Oxide Semiconductor (CMOS) sensor, a Charge-Coupled Device (CCD) sensor, or the like.

In some embodiments, unit cells (pixel elements) can include sub-20 μm dimensions. In some embodiments, the focal plane array 218 can include individual pixel elements arranged into an array such as a focal plane array that defines the detector format and image resolution. Common 4:3 aspect ratio video formats include: 160×120, 320×240, 640×480, 1024×768 and 1280×960. In some embodiments, the focal plane array 106 can include a plurality of focal plane arrays as described further in FIGS. 5A and 5B. In some embodiments, the detector module can include a bias board to provide power for the focal plane array as well as signal conditioning. In some embodiments, the detector module 206 can include a shutter.

Controller 208 can include one or more processors 220 and memory 222 to control the focal plane array 218 and the actuator 214. The controller 208 can be communicatively coupled to the focal plane array 218 to provide sensor clocking and image processing of sensor data collected by the focal plane array 218. The controller 208 can also be communicatively coupled to the actuator 214. The controller 208 can provide positioning signals to the actuator 214 to backscan the stage 216 and the focal plane array 218 coupled thereto. The positioning signals can be proportional to a drive velocity associated with the backscan.

In some embodiments, the controller 208 can determine a drive velocity that is proportional to the aircraft or satellite ground velocity and causes the backscan to match the motion of an image during image collection. The controller 208 can include one or more sensors to determine a velocity of the camera body 202. The velocity of the camera body 202 can be associated with the aircraft or satellite ground velocity. The one or more sensors can include, for example, positioning sensors, accelerometers, magnetometers, and the like. In some embodiments, the controller 208 can be communicatively coupled to the I/O module 210 and determine the velocity of the camera body 202 based on data received from the I/O Module 210. In other embodiments, the drive velocity can be pre-programmed based on a predetermined orbit velocity, such as a low earth orbit velocity.

After determining the velocity of the camera body 202, the drive velocity can be determined using a method such that the image smear caused by an image sensor with a long time constant can be reduced or eliminated. The method can use the velocity of the camera body 202 to determine a forward platform velocity associated with the motion of an aircraft or satellite. The method can determine a drive velocity that when applied to the stage 216 and focal plane array 218, will backscan to compensate for the forward platform velocity.

As used herein, controller 208 can include one or more processors, which can be implemented as one or more integrated circuits (e.g., a microprocessor or microcontroller), to control the operation of the actuator 214 and/or the focal plane array 218. The one or more processors can be implemented as a special purpose processor, such an application-specific integrated circuit (ASIC), which may be customized for a particular use and not usable for general-purpose use. In some implementations, an ASIC may be used to increase the speed of image processing. In some embodiments, the controller 208 can include one or more graphics processing units (GPUs). The GPUs can be configured to process sensor data collected by the focal plane array 218. One or more processors, including single core and/or multicore processors, can be included in controller 208. In some embodiments, the controller 208 can be outside the camera body 202. In these embodiments, the focal plane array 218 and the actuator can be communicatively coupled to the I/O module 210.

The I/O module 210 can be configured to send and receive data with external systems communicatively coupled to the imaging system 200. The imaging system 200 can be positioned in a vehicle such as an airplane, satellite, and the like. The data sent and received to and from external systems can include velocity, position, temperature, and the like. In some embodiments, the I/O module can transmit sensor data collected by the focal plane array 218 and/or the controller 208 to one or more systems on the vehicle. I/O module 210 can include device controllers, one or more modems, Universal Serial Bus (USB)® interfaces, radio frequency transceiver components, a serial bus, and the like to send and receive data.

Figure 3:
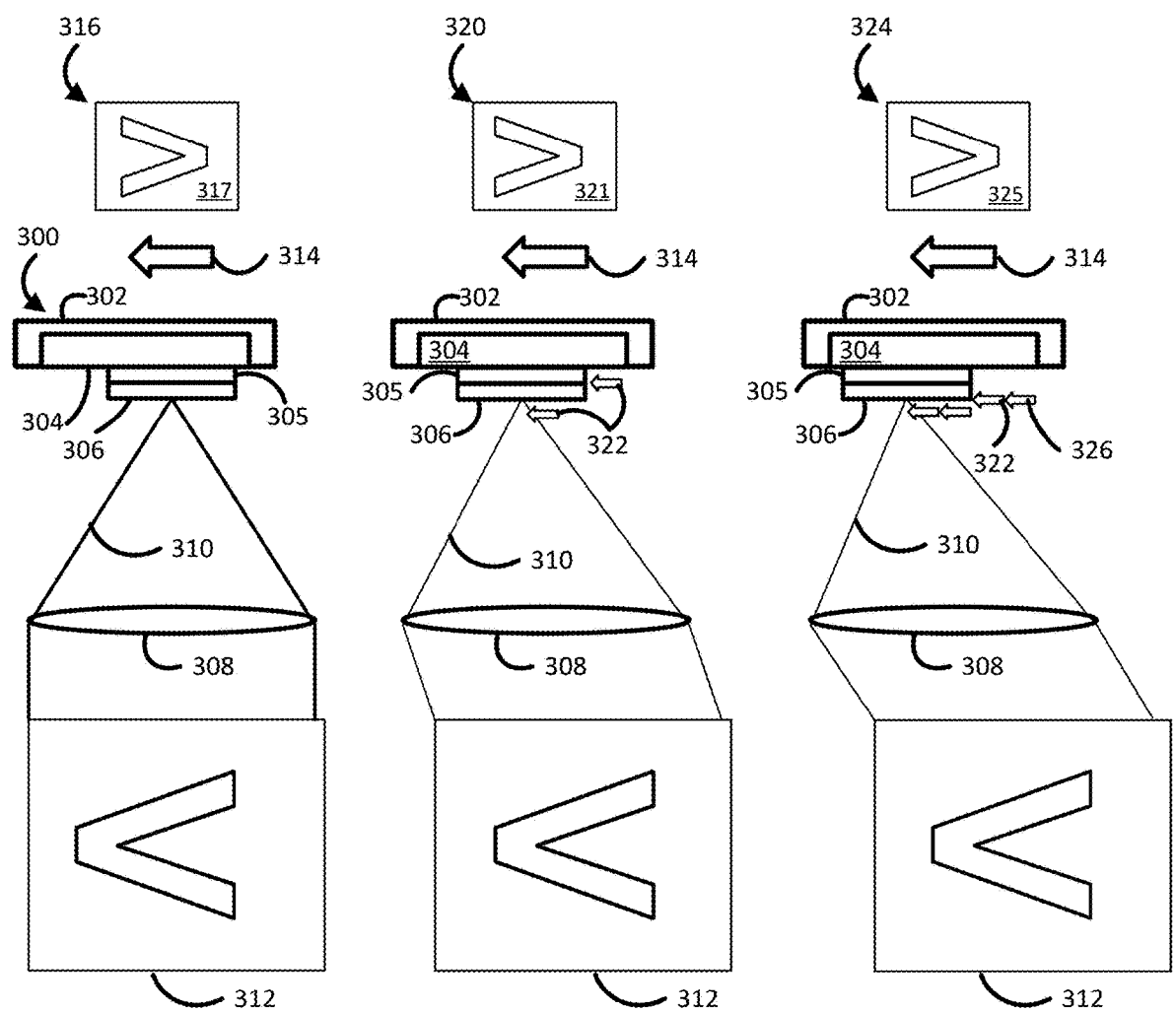
FIG. 3 illustrates three successive frames captured to make a "snap" using an imaging system with a focal plane array that is backscanned at a velocity that matches and cancels the velocity of the camera body relative to the scene according to an embodiment of the present invention.

FIG. 3 illustrates three successive frames captured to make a "snap" using an imaging system with a focal plane array that is backscanned at a velocity that matches and cancels the velocity of the camera body relative to the scene according to an embodiment of the present invention. The imaging system 300 includes a detector module 302, an actuator 304, a stage 305, a focal plane array 306, and a lens 308. In some embodiments, the imaging system 300 can be mounted in a moving vehicle such as a satellite, an aircraft, an automobile and the like. FIG. 3 also illustrates the rays 310 associated with an object on the ground 312.

In FIG. 3, the imaging system 300 is moving at a velocity 314 over the object on the ground 312. In a first frame 316, the rays 310 associated with the object on the ground 312 are centered on the focal plane array 306 and a first image 317 on the focal plane array 106 shows the object on the ground 312. For a second frame 320, imaging system 300 has moved relative to the object on the ground 312 due to the velocity 314 of the imaging system 300. In the second frame 320, the rays 310 associated with the object on the ground 312 are no longer in a first position on the detector module 302 but have moved a first distance 322. In the embodiment illustrated in FIG. 3, a controller, such as controller 208 described in FIG. 2, causes the actuator 304 to backscan the stage 305 at a drive velocity corresponding to the velocity 314. The drive velocity causes the stage 305 and the focal plane array 306 to translate the first distance 322. Accordingly, a second image 321 on the focal plane array 306 is in the same position as the first image 317 on the focal plane array 306.

For a third frame 324, the imaging system 300 has moved further relative to the object on the ground 312 due to the velocity 314 of the imaging system 300. In the third frame 324 the rays 310 associated with the object on the ground 312 have now moved the first distance 322 and a second distance 326. The controller causes the actuator 304 to backscan the stage 305 and the focal plane array 306 the second distance 326. Accordingly, a third image 325 on the focal plane array 306 is in the same position as the first image 317 and the second image 321 on the focal plane array 306. As illustrated in the first image 317, the second image 321, and the third image 325, the drive velocity can be configured to backscan the stage and focal plane array 306 to stabilize the image on the focal plane array 306. As a result, no image smearing occurs. If an integrated image of the object on the ground 312 was produced from the integration of the first image 317, the second image 321, and the third image 325 with backscanning, the integrated image of the object on the ground 312 will have an improved signal to noise ratio and other quality metrics in comparison to a single image or an integrated image produced from images without backscanning.

FIG. 4A illustrates two full cycles of capturing consecutive image frames with a focal plane array moving at a constant velocity relative to the velocity of the camera body according to an embodiment of the present invention. The plot 400 illustrates a sawtooth motion profile of the stage generated by the method. In some embodiments, the method automatically adjusts scan velocity to match the velocity of the image sensor relative to the earth's surface. The plot 400 shows the stage position 402 along the y-axis and the time 404 along the x-axis. A starting position 406 is at zero and a final position 408 is in a position based on a physical range of the stage and a length of the snap period. In some embodiments, the final stage position is determined by the shorter of the physical range and the length of the snap period.

FIG. 4A incldes three snap periods, a first snap period 410, a second snap period 440, and a third snap period 460. The first snap period 410 includes capture of a first frame 413 when the focal plane array is moving from position 412 to position 414, a second frame 415 when the focal plane array is moving from position 414 to position 416, and a third frame 417 when the focal plane array is moving from position 416 to position 418. The frames are captured during a total exposure time. For example, the second time segment 424 associated with the first snap period 410, which has a total movement cycle period of 420. The exposure duration for each frame depends on the saturation time of the image sensor. In an example embodiment, the frames can be captured at a rate of 30 frames per second. The resulting maximum exposure time is 33.3 ms per frame, or 100 ms for the three frame total exposure time. The velocity of the focal plane array during the first snap period 410 can be divided into three time segments. The first time segment 422 is associated with a period of time for the actuator to accelerate and cause the focal plane array to reach a constant velocity. The second time segment 424 is associated with a period of time where the actuator is causing the focal plane array to move at a constant velocity corresponding to the velocity of the camera body and the constant velocity opposes the motion of the image plane caused by the velocity of the camera body. The velocity of the camera body can correspond to motion of a platform in which the camera body is placed or mounted. A platform can include, for example, a satellite, an airplane, and the like.

During the second time segment 424, an image is stabilized on the focal plane array and frames can be stacked together with no image smear or blur. In some embodiments, if the image sensor will not be saturated, a single, continuous frame can be captured for the duration of the second time segment 424. In some embodiments the sensor can operate at a higher frame rate and more than 3 frames can be stacked during the same 424 time segment. The third time segment 426 is associated with a period of time required for the actuator to move the focal plane array from the final position 408 to the starting position 406. In some embodiments, the third time segment can be considered the reset time.

The second snap period 440 includes capture of a first frame 443 when the focal plane array is moving from 442 to 444, a second frame 445 when the focal plane array is moving from 444 to 446, and a third frame 447 when the focal plane array is moving from 446 to 448. The frames are captured during an total exposure time 450 associated with the second snap period 440, which has a total movement cycle period of 450. The velocity of the focal plane array during the second snap period 440 can be divided into three time segments. The first time segment 452 is associated with a period of time for the actuator to accelerate and cause the focal plane array to reach a constant velocity. The second time segment 454 is associated with a period of constant time where the actuator is causing the focal plane array to move at a constant velocity. During the second time segment 454, an image is stabilized on the focal plane array and frames can be stacked together with reduced or no image smear or blur. The third time segment 456 is associated with a period of time required for the actuator to move the focal plane array from the final position 408 to the starting position 406. For simplicity, the third snap period is shortened but includes three stacked frames similar to the first snap period 410 and the second snap period 440. The velocity of the stage during the second time segments 424 and 454 can correspond to the drive velocity associated with the controller 208 described in FIG. 2. In some embodiments, a stabilization period can be inserted between the third time segment 426 of first snap period 410 and the first time segment 452 of the second snap period 440.

FIG. 4B illustrates the overlap between snaps according to an embodiment of the present invention. Snap 1, snap 2, and snap 3 are shown along the direction of travel along the ground 470. The first snap overlap 472 and the second snap overlap 474 provide for a continuous strip image associated with one or more focal plane arrays on a focal plane array. A field of view of the imaging system captures an image with a dimension 476, d, that corresponds to a distance parallel to the direction of travel along the ground 470. The time for a trailing edge 478 of snap 1 to travel a across a scene captured by snap 1 and reach a first edge 480 of the first snap overlap 472 corresponds to the time available for the actuator to reset the stage and focal plane array to the starting position 406. Each snap includes three frames and can use frame stacking to improve the signal to noise ratio of the resulting snap. White noise from the detector array improves with multiple frames added together; the SNR benefit corresponds to the square root of the number of frames stacked. Longer duration backscanning of the image sensor or operating the sensor with a higher frame rate results in a greater number of frames per snap and improved SNR of the resulting snap image.

Figure 5B:
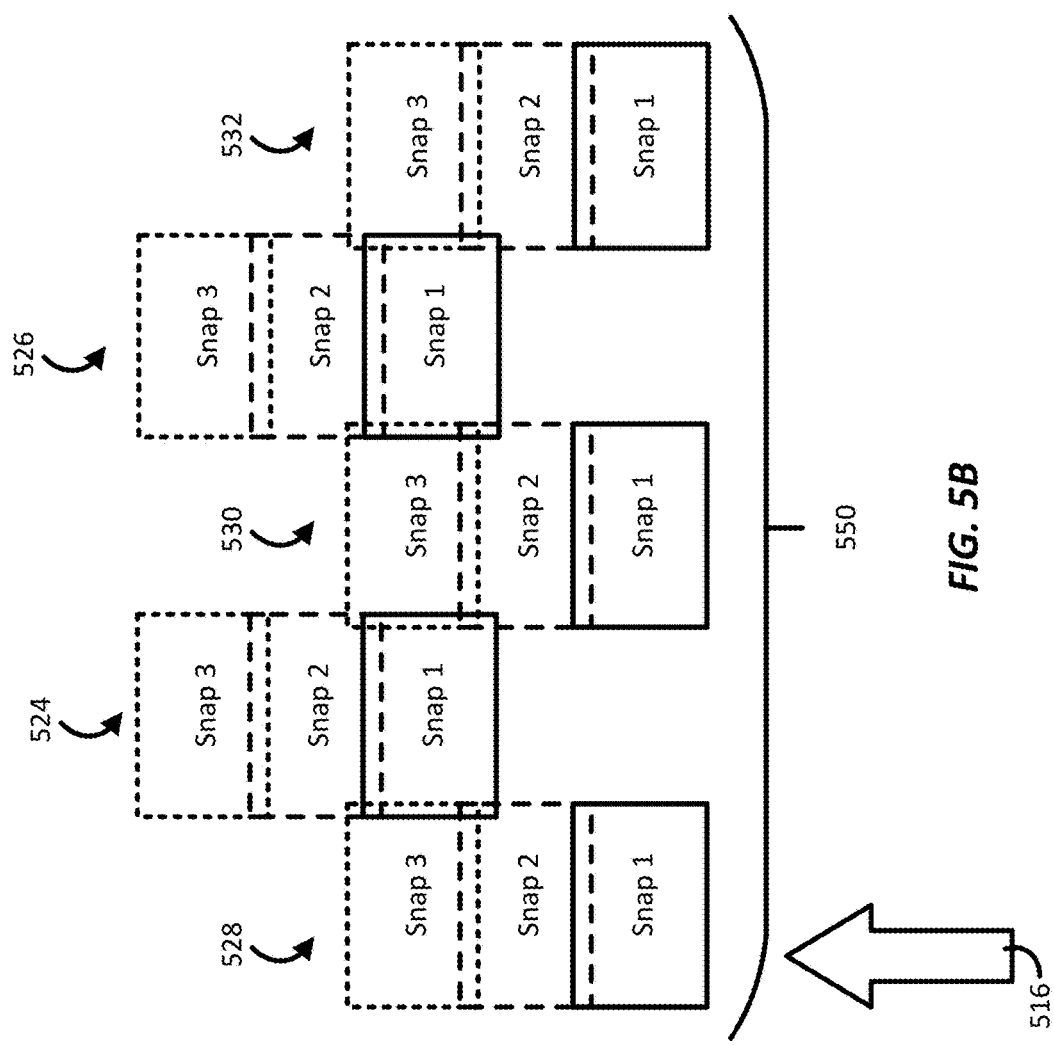
FIG. 5B illustrates the ground swath width of a scan associated with five stagger butted focal plane arrays according to an embodiment of the present invention.
Figure 5A:
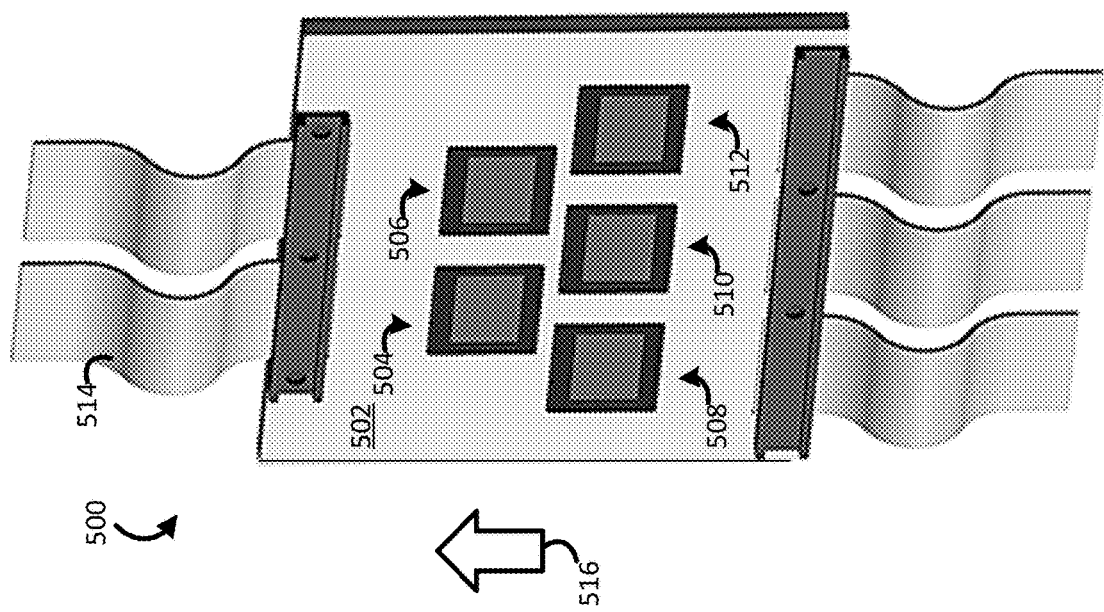
FIG. 5A illustrates a focal plane array consisting of five stagger butted focal plane arrays on a stage according to an embodiment of the present invention.

FIG. 5A illustrates a focal plane array consisting of five stagger butted focal plane arrays on a piezo stage according to an embodiment of the present invention. The imaging system 500 includes a focal plane array 502, a first staring focal plane array 504, a second staring focal plane array 506, a third staring focal plane array 508, a fourth staring focal plane array 510, and a fifth staring focal plane array 512, and thermal strapping 514. Each focal plane array can include one or more spectral filters. In some embodiments, the focal plane array 502 can be coupled to a stage as described in FIG. 2. In some embodiments, each focal plane array can capture images according to the cycles illustrated in FIGS. 4A and 4B.

FIG. 5B illustrates the ground swath width 550 of a scan associated with five stagger butted focal plane arrays according to an embodiment of the present invention. In some embodiments, referring to FIGS. 5A and 5B, the focal plane arrays can be staggered and butted to eliminate dead areas in a scan generated by focal plane array 502. For example, the first staring focal plane array 504 and the second staring focal plane array 506 are aligned together and staggered from the third staring focal plane array 508, the fourth staring focal plane array 510, and the fifth staring focal plane array 512. The direction of satellite motion 516 will capture a strip of images corresponding to each focal plane array. For example, the first staring focal plane array 504 can correspond to a first strip 524, the second staring focal plane array 506 can correspond to a second strip 526, the third staring focal plane array 508 can correspond to a third strip 528, the fourth staring focal plane array 510 can correspond to a fourth strip 530, and the fifth staring focal plane array 512 can correspond to a fifth strip 532. Each strip can consist of a plurality of snaps and each snap can correspond to a plurality of frames as illustrated in FIGS. 4A and 4B. The snap dimensions perpendicular to the direction of motion form the ground swath width 550.

While FIGS. 5A and 5B illustrate an imaging system 500 with 5 focal plane arrays, according to some embodiments of the present invention, an imaging system can include from 1 to 10 focal plane arrays, with up to 12 spectral filters. Other embodiments can include many focal plane arrays with many spectral filters. Benefits of increasing the number of focal plane arrays is support for multi-spectral imaging. One of ordinary skill in the art would recognize many variations, modifications, and alternatives.

As depicted in FIGS. 5A and 5B, imaging system 500 is arranged in a staggered layout. But staggering is not required. For example, focal plane arrays 504, 506, 508, 510, and 512 can be arranged side by side. In either case, the layout can be adjusted such that the layout has a different width or height than as depicted. For example, focal plane arrays 504, 506, 508, 510, and 512 can be spread out, evenly distributed or otherwise, thereby increasing ground swath width 550. In another example, focal plane arrays 504 and 506 can be spread further out in a vertical dimension from focal plane arrays 508, 510, and 512.

Additionally or alternatively, an amount of overlap between adjacent arrays can also be adjusted. For example, as depicted, for example, focal plane array 504 and focal plane array 508 overlap slightly. But the focal plane arrays, e.g., 504, 506, 508, 510, and 512 can be spaced further apart or closer together with any degree of overlap.

Figure 6:
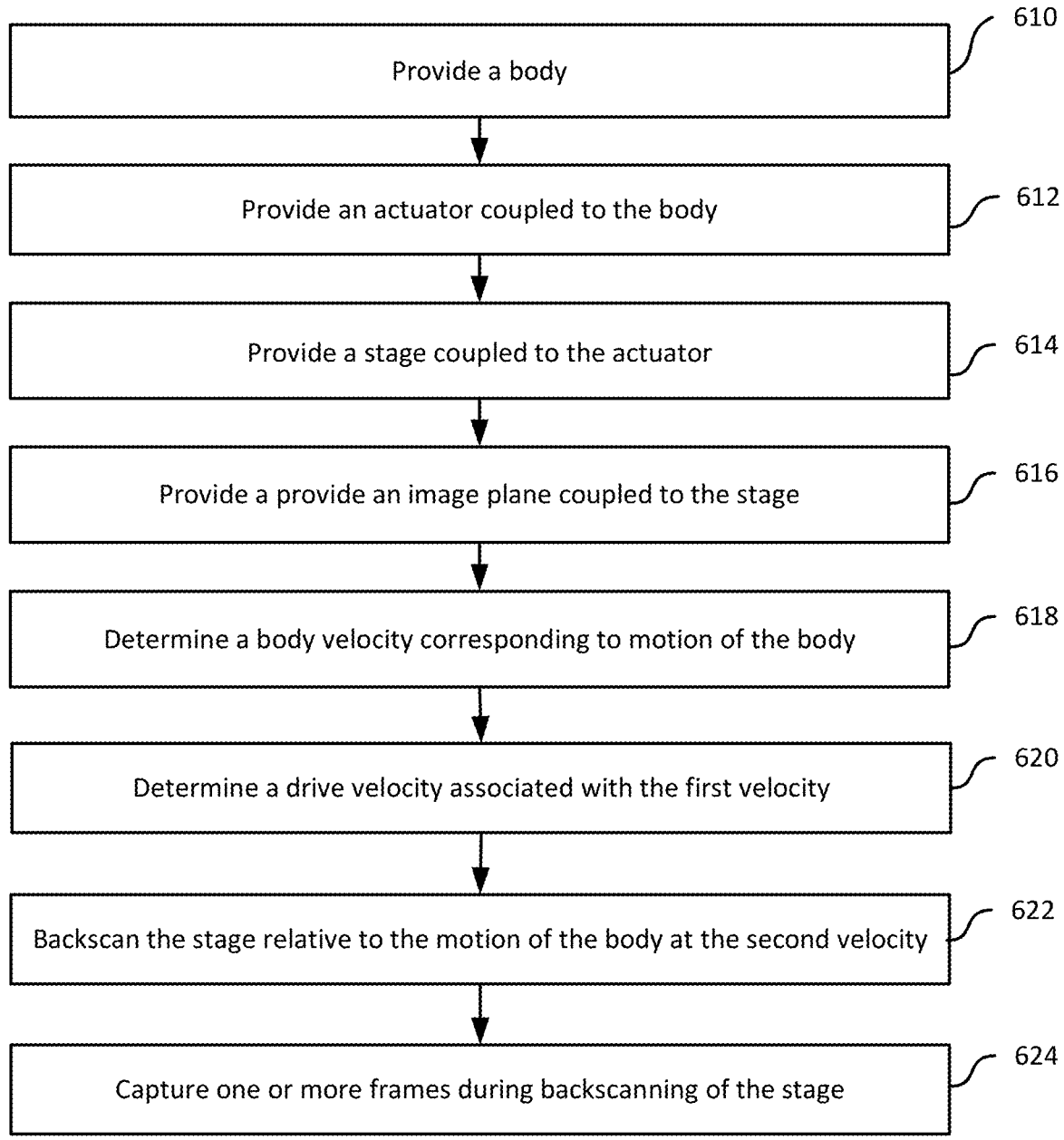
FIG. 6 is a simplified flowchart illustrating a method of translating a focal plane array of a sensor according to an embodiment of the present invention.

FIG. 6 is a simplified flowchart illustrating a method 600 of translating a focal plane array of a sensor according to an embodiment of the present invention. At 610, the method provides a body. In some embodiments the body is in motion. At 612, the method provides an actuator coupled to the body. In some embodiments the actuator can be a piezoelectric actuator. At 614, the method provides a stage coupled to the actuator. In some embodiments the actuator and the stage can comprise a piezoelectric stage. At 616, the method provides a focal plane array coupled to the stage. The focal plane array can include one or more focal plane arrays. At 618, the method determines a body velocity corresponding to motion of the body. At 620, the method determines a drive velocity proportional to the body velocity. At 622, the method backscans the stage at the drive velocity relative to the motion of the body. In some embodiments, the actuator translates the stage to backscan the stage and focal plane array at the drive velocity. At 624 the method, captures one or more frames during backscanning of the stage. In some embodiments, the one or more focal plane arrays can capture the one or more frames.

It should be appreciated that the method illustrated in FIG. 6 provide a particular method of scanning a focal plane array during earth observation imaging according to an embodiment of the present invention. Other operations may also be performed according to alternative embodiments. Moreover, the individual operations illustrated in FIG. 6 may include multiple sub-operations that may be performed in various sequences as appropriate to the individual operation. Furthermore, additional operations may be added or existing operations may be removed depending on the particular applications. One of ordinary skill in the art would recognize many variations, modifications, and alternatives.

Figure 7:
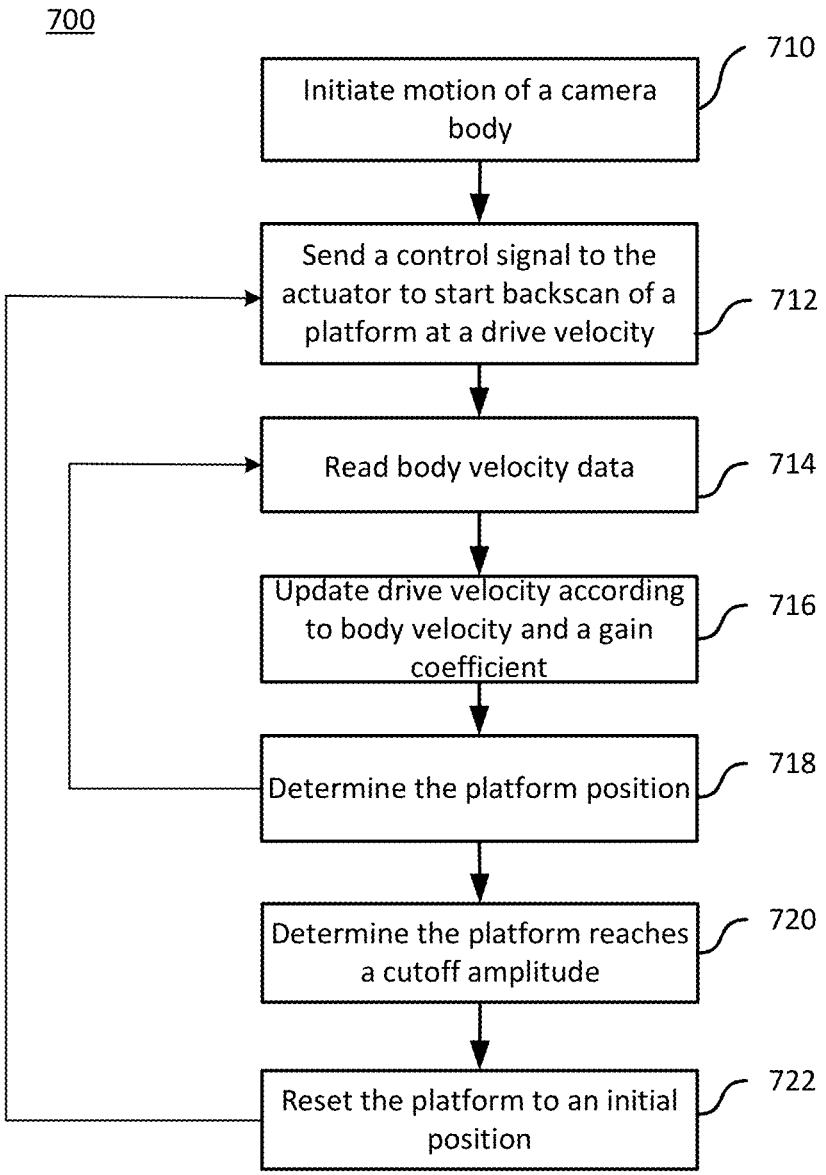
FIG. 7 is a simplified flowchart illustrating a method for backscanning a focal plane array according to an embodiment of the present invention.

FIG. 7 is a simplified flowchart illustrating a method 700 for backscanning a focal plane array according to an embodiment of the present invention. At 710, the method initiates motion of a camera body. In some embodiments, the motion of the camera body can be associated with a path along the surface of the earth. The camera body can include one or more of: a lens, an actuator, a stage with a focal plane array (or an image plane), and a controller. In some embodiments, the camera body can include an I/O module. At 712, the method sends a control signal to the actuator to start a backscan of the focal plane array at a drive velocity. In some embodiments, the control signal can include a command to begin capturing images. In some embodiments, the control signal can start/restart a timer associated with the backscan of the stage. At 714, the method reads body velocity. Body velocity can be determined and or received by a processor in the controller. The body velocity can be read by the processor in the controller. In some embodiments, the body velocity can indicate that a constant drive velocity has been reached and the controller will send a command to the focal plane array to begin capturing one or more images.

At 716, the method updates the drive velocity according to the body velocity and a gain coefficient. In some embodiments the gain coefficient can be a vector or matrix with multiple terms. The gain coefficient can adjust the drive velocity based on the properties of the image sensor such as image sensor dimensions, actuator characteristics, and focal plane array characteristics. In some embodiments, the gain coefficients can be applied at specific stage positions during a backscan. In some embodiments, the gain coefficients can compensate for hysteresis effects in a piezoelectric actuator to improve backscan slope linearity. In some embodiments, additional velocity scale factors can be added to address variables specific to a particular implementation.

At 718, the method determines the stage position. In some embodiments, a processor in the controller can read data from one or more stage position sensors to determine the stage position. In other embodiments, the stage position can be estimated using the drive velocity. In other embodiments, the stage position can be extrapolated based on a predetermined time period. At 720, the method determines the stage reaches a cutoff amplitude. The cutoff amplitude can be associated with a maximum position of the stage and actuator relative to the body. In some embodiments, an extrapolated stage position can be used to determine the stage will reach the cutoff amplitude within the predetermined time period. At 722, the method, after reaching the cutoff amplitude, returns the stage and actuator to an initial position or state.

It should be appreciated that the specific operations illustrated in FIG. 7 provide a particular method of backscanning a focal plane array during earth observation imaging according to an embodiment of the present invention. Other sequences of operations may also be performed according to alternative embodiments. Moreover, the individual operations illustrated in FIG. 7 may include multiple sub-operations that may be performed in various sequences as appropriate to the individual operation. Furthermore, additional operations may be added or existing operations may be removed depending on the particular applications. One of ordinary skill in the art would recognize many variations, modifications, and alternatives.

Figure 8:
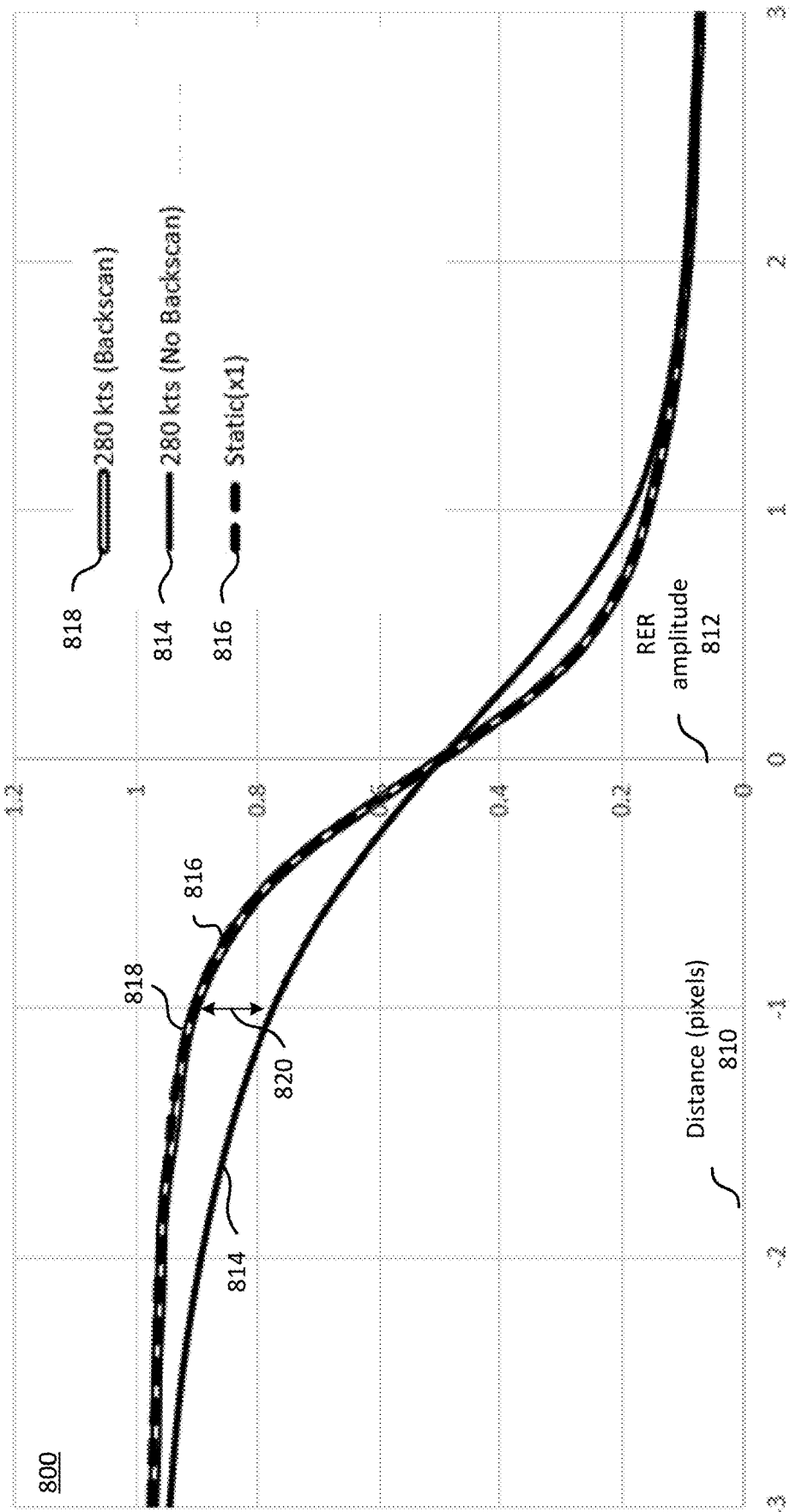
FIG. 8 shows a comparison of relative edge response for various focal plane array configurations according to embodiments of the present invention.

FIG. 8 shows a comparison of relative edge response (RER) for various focal plane array configurations according to embodiments of the present invention. The plot 800 illustrates the RER for an image as a function of the distance from the edge. The x-axis 810 illustrates the distance in pixels from an edge at zero on the x-axis 810. The y-axis 812 illustrates the RER amplitude. A first focal plane array configuration is a static focal plane array illustrated by trace 816 that captures a single frame. The RER of the static focal plane array at the zero pixel is 0.52759.

A second focal plane array configuration is a non-backscanning focal plane array illustrated by trace 814. The second focal plane array configuration is mounted on a test vehicle that simulates motion of the non-backscanning focal plane array at a ground speed of 280 kts. The RER of the non-backscanning focal plane array travelling at a ground speed of 280 kts at the zero pixel is 0.34141. A third focal plane array configuration is a backscanning focal plane array illustrated by trace 818 mounted on a test vehicle that simulates motion of the focal plane array at a ground speed of 280 kts. The RER of the backscanning focal plane array at the zero pixel is 0.52953. The plot 800 illustrates that the RER of the non-backscanning focal plane array is degraded 820 by ~35% from the static focal plane array. The degraded RER is due to smearing caused by the motion of the focal plane array during the focal plane array integration time. The plot 800 shows the RER of the backscanning focal plane array nearly equals the RER of the static focal plane array.

As discussed, certain embodiments can be implemented in a satellite system, which can be relatively stable such that the stage velocity matches the platform velocity. Alternatively, embodiments can be implemented on aircraft, which may have slight deviations in stage velocity. Accordingly, a feedback loop can be implemented such that the stage velocity is periodically updated on a real-time basis. Different techniques are possible such as correlating pixels between images or performing the process described with respect to FIGS. 7 and 9.

Figure 9:
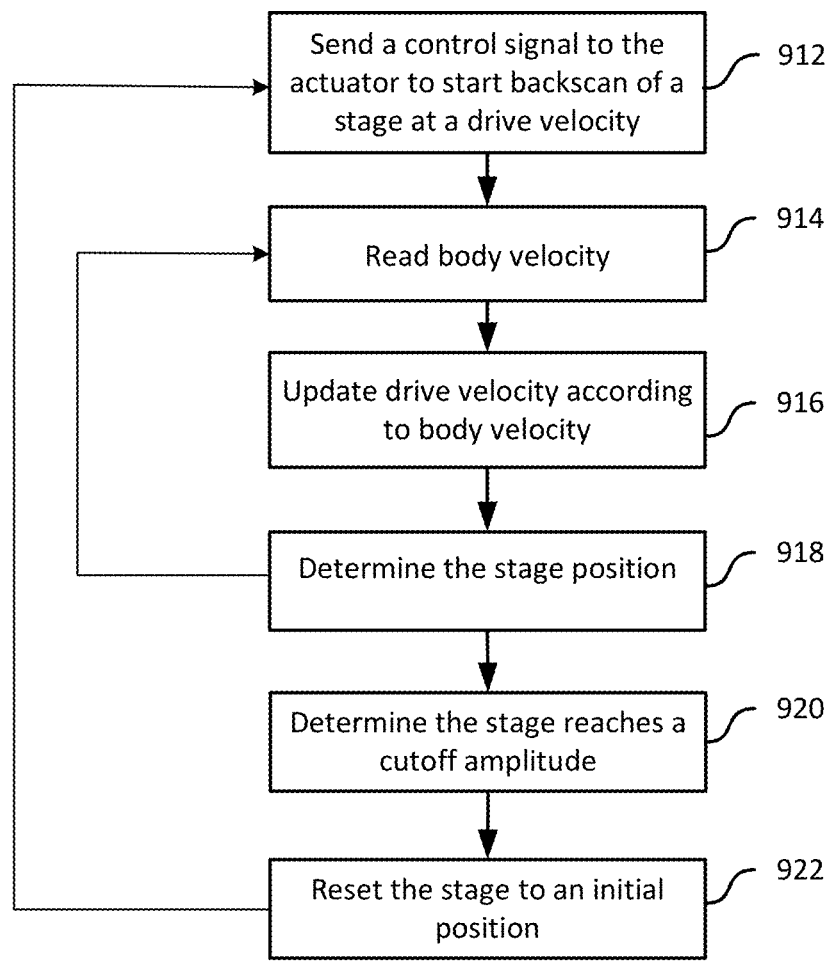
FIG. 9 is a simplified flowchart illustrating an additional method for backscanning a focal plane array according to an embodiment of the present invention.

FIG. 9 is a simplified flowchart illustrating an additional method 900 for backscanning a focal plane array according to an embodiment of the present invention. At 912, the method sends a control signal to the actuator to start a backscan of a stage at a drive velocity. A focal plane array can be attached to the stage. At 914, the method reads the body velocity. Body velocity can be determined and or received by a processor in the controller. The body velocity can be received from an I/O subsystem. In some embodiments, the body velocity can indicate that a constant drive velocity has been reached and the controller will send a command to the focal plane array to begin capturing one or more images.

At 916, the method updates the drive velocity according to the body velocity. In some cases, one or more gain coefficients can be used. For example, a single gain coefficient can be used. In another example, multiple gain coefficients, such as a vector or matrix with multiple terms, can be used. The gain coefficient(s) can adjust the drive velocity based on the properties of the image sensor such as image sensor dimensions, actuator characteristics, and focal plane array characteristics. In some embodiments, the gain coefficient(s) can be applied at specific stage positions during a backscan. In some embodiments, the gain coefficient(s) can compensate for hysteresis effects in a piezoelectric actuator to improve backscan slope linearity. In some embodiments, additional velocity scale factors can be added to address variables specific to a particular implementation.

At 918, the method determines the stage position. In some embodiments, a processor in the controller can read data from one or more stage position sensors to determine the stage position. In other embodiments, the stage position can be estimated using the drive velocity. In other embodiments, the stage position can be extrapolated based on a predetermined time period.

At 920, the method determines the stage reaches a cutoff amplitude. The cutoff amplitude can be associated with a maximum position of the stage and/or actuator relative to the body. In some embodiments, an extrapolated stage position can be used to determine the stage will reach the cutoff amplitude within the predetermined time period.

At 922, after determining that the stage reaches the cutoff amplitude, the method resets the stage to an initial position. The focal plane array is also thereby reset to an initial position.

It should be appreciated that the specific operations illustrated in FIG. 9 provide a particular method of backscanning a focal plane array during earth observation imaging according to an embodiment of the present invention. Other sequences of operations may also be performed according to alternative embodiments. Moreover, the individual operations illustrated in FIG. 9 may include multiple sub-operations that may be performed in various sequences as appropriate to the individual operation. Furthermore, additional operations may be added or existing operations may be removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An imaging system, comprising:
   a body;
   a stage coupled to the body;
   an actuator coupled to the body and the stage, wherein the actuator is configured to move the stage in a direction relative to the body;
   a focal plane array that comprises one or more detectors and coupled to the stage; and
   a controller coupled to the actuator, wherein the controller is configured to determine a velocity of the body, wherein the controller is configured to cause the actuator to backscan the stage from an initial position in the direction at a drive velocity corresponding to the velocity of the body, wherein backscanning the stage comprises determining one or more gain coefficients and updating the drive velocity in response to the one or more gain coefficients, and wherein the controller is communicatively coupled to the one or more detectors and causes the one or more detectors to capture image data during the backscan, and the controller is configured to reset the stage to the initial position.

2. The imaging system of claim 1 wherein the actuator is a piezoelectric actuator.

3. The imaging system of claim 1 further comprising a lens coupled to the body.

4. The imaging system of claim 1 wherein the drive velocity is characterized by a sawtooth profile.

5. The imaging system of claim 1 wherein the velocity of the body corresponds to a forward velocity of at least one of an aircraft or a satellite.

6. The imaging system of claim 1 wherein the focal plane array further comprises one or more spectral filters.

7. The imaging system of claim 1 further comprising an I/O module configured to transmit and receive at least one or more of the velocity of the body, the drive velocity, or the image data.

8. A method comprising:
   providing a body;
   providing an actuator coupled to the body;
   providing a stage coupled to the actuator;
   providing an image sensor coupled to the stage;
   determining a body velocity corresponding to motion of the body;
   determining a drive velocity associated with the body velocity;
   backscanning, using the actuator, the stage at the drive velocity relative to the body velocity, wherein the backscanning comprises:
      determining one or more gain coefficients; and
      updating the drive velocity in response to the one or more gain coefficients;
   capturing, by the image sensor, one or more frames during backscanning of the stage; and
   resetting, using the actuator, the stage to an initial position.

9. The method of claim 8 wherein backscanning the stage further comprises sending a control signal to the actuator.

10. The method of claim 8 further comprising determining a position of the stage using the drive velocity and a timer.

11. The method of claim 8 wherein determining the body velocity further comprises reading the body velocity from a memory.

12. The method of claim 8 further comprising:
providing one or more stage position sensors;
receiving position sensor data from the one or more stage position sensors; and
determining stage position using the position sensor data.

13. A method comprising:
sending a control signal to an actuator to start a backscan of a stage at a drive velocity, wherein the stage is connected to the actuator;
reading a body velocity;
updating the drive velocity of the stage in response to the body velocity, wherein updating the drive velocity further comprises:
determining one or more gain coefficients; and
updating the drive velocity in response to the one or more gain coefficients;
determining a position of the stage;
determining that the stage has reached a cutoff amplitude; and
thereafter, sending a second control signal to reset the stage to an initial position.

14. The method of claim 13 wherein sending the control signal further comprises resetting a timer.

15. The method of claim 14 further comprising determining the position of the stage using the body velocity and the timer.

16. The method of claim 13 wherein determining the body velocity further comprises reading the body velocity from a memory.

17. The method of claim 13 wherein determining the body velocity further comprises receiving the body velocity from an I/O subsystem.

18. The method of claim 13 wherein determining the stage reaches the cutoff amplitude further comprises:
receiving position sensor data; and
determining the position sensor data exceeds a value associated with the cutoff amplitude.

* * * * *